United States Patent
Tu et al.

(10) Patent No.: US 10,594,994 B2
(45) Date of Patent: Mar. 17, 2020

(54) PROJECTION SYSTEM AND PROJECTION METHOD

(71) Applicant: Coretronic Corporation, Hsin-Chu (TW)

(72) Inventors: Hsun-Cheng Tu, Hsin-Chu (TW); Chien-Chun Peng, Hsin-Chu (TW); Yung-Chiao Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/522,662

(22) Filed: Jul. 26, 2019

(65) Prior Publication Data

US 2020/0036949 A1  Jan. 30, 2020

(30) Foreign Application Priority Data

Jul. 30, 2018 (CN) .......................... 2018 1 0852009

(51) Int. Cl.
*H04N 9/31* (2006.01)
*H04N 9/28* (2006.01)
*G06T 7/80* (2017.01)

(52) U.S. Cl.
CPC ............. *H04N 9/3194* (2013.01); *G06T 7/80* (2017.01); *H04N 9/3185* (2013.01)

(58) Field of Classification Search
CPC ....... H04N 9/3194; H04N 9/3185; G06T 7/80
USPC ................ 348/745, 806, 746, 747, 744, 687
See application file for complete search history.

(56) References Cited

U.S. PATENT DOCUMENTS

| | | | |
|---|---|---|---|
| 6,061,102 A | 5/2000 | Sheppard et al. |
| 7,942,530 B2 | 5/2011 | Majumder et al. |
| 7,969,455 B2 | 6/2011 | Yoshida et al. |
| 8,368,762 B1 | 2/2013 | Chen et al. |
| 8,406,562 B2 | 3/2013 | Bassi et al. |
| 8,550,635 B2 | 10/2013 | Kotani |
| 8,711,225 B2 | 4/2014 | Chang et al. |
| 9,229,585 B2 | 1/2016 | Fujikawa et al. |
| 9,292,945 B2 | 3/2016 | Kubota |

(Continued)

FOREIGN PATENT DOCUMENTS

| | | |
|---|---|---|
| CN | 101673523 | 3/2010 |
| CN | 105308503 | 2/2016 |

(Continued)

*Primary Examiner* — Jefferey F Harold
*Assistant Examiner* — Jean W Desir
(74) *Attorney, Agent, or Firm* — JCIPRNET

(57) ABSTRACT

A projection system and a projection method are provided. A projector projects a correction image towards a projection screen. The correction image has a pattern, a portion of the pattern exceeds a frame of the projection screen, and the pattern includes strip regions. An image capturing device obtains a captured image towards the projection screen and transmits the captured image to a processor. The captured image has brightness information of the strip regions. The processor analyzes a brightness difference of the strip regions between the projection screen and the frame in the captured image, calculates a position of the frame according to the brightness difference, and performs calculations according to the position of the frame to obtain a coordinate conversion table. The projector performs a warping operation on the projected image according to the table and projects the warped projected image into the projection screen.

12 Claims, 4 Drawing Sheets

(56) References Cited

U.S. PATENT DOCUMENTS

| | | |
|---|---|---|
| 9,437,160 B2 | 9/2016 | Jaynes et al. |
| 9,547,228 B2 | 1/2017 | Kim et al. |
| 9,661,257 B2 | 5/2017 | Ishikawa et al. |
| 9,769,466 B2 | 9/2017 | Lin et al. |
| 9,781,395 B2 | 10/2017 | Ishikawa et al. |
| 9,781,396 B2 | 10/2017 | Furui |
| 9,818,377 B2 | 11/2017 | Ishikawa et al. |
| 9,936,182 B2 | 4/2018 | Ohsawa et al. |
| 10,091,475 B2 | 10/2018 | Ishikawa et al. |
| 2002/0180727 A1 | 12/2002 | Guckenberger et al. |
| 2005/0105057 A1 | 5/2005 | Matsuda et al. |
| 2005/0168705 A1 | 8/2005 | Li et al. |
| 2006/0023171 A1 | 2/2006 | Miyasaka |
| 2008/0062164 A1 | 3/2008 | Bassi et al. |
| 2008/0089611 A1* | 4/2008 | McFadyen ............ G06T 5/006 382/289 |
| 2008/0246781 A1 | 10/2008 | Surati et al. |
| 2011/0025988 A1 | 2/2011 | Haraguchi et al. |
| 2011/0058098 A1 | 3/2011 | Ivashin |
| 2011/0148904 A1 | 6/2011 | Kotani |
| 2011/0279738 A1 | 11/2011 | Takahashi et al. |
| 2012/0182416 A1* | 7/2012 | Kawaguchi ......... H04N 9/3185 348/128 |
| 2013/0258116 A1 | 10/2013 | Chang et al. |
| 2014/0225870 A1 | 8/2014 | Fujikawa et al. |
| 2014/0267427 A1 | 9/2014 | Hasegawa |
| 2015/0077573 A1 | 3/2015 | Ishikawa et al. |
| 2015/0213584 A1 | 7/2015 | Ishikawa et al. |
| 2016/0021350 A1 | 1/2016 | Schultz et al. |
| 2016/0088276 A1 | 3/2016 | Lin et al. |
| 2016/0295184 A1 | 10/2016 | Ishikawa et al. |
| 2016/0353068 A1 | 12/2016 | Ishikawa et al. |
| 2017/0155880 A1 | 6/2017 | Nagata et al. |
| 2017/0302838 A1 | 10/2017 | Yang et al. |
| 2018/0220113 A1 | 8/2018 | Ouchi |
| 2018/0324396 A1 | 11/2018 | Ishikawa et al. |
| 2019/0104289 A1 | 4/2019 | Lin et al. |
| 2019/0104290 A1 | 4/2019 | Lin et al. |
| 2019/0104291 A1 | 4/2019 | Lin et al. |
| 2019/0149787 A1 | 5/2019 | Peng et al. |

FOREIGN PATENT DOCUMENTS

| | | |
|---|---|---|
| CN | 105376540 | 3/2016 |
| TW | I261792 | 9/2006 |
| TW | I454147 | 9/2014 |
| TW | I592020 | 7/2017 |

* cited by examiner

| Upper frame coordinate information | Lower frame coordinate information |
|---|---|
| (x, y) = (600, 155) | (x, y) = (298, 627) |
| (x, y) = (680, 103) | (x, y) = (386, 626) |
| (x, y) = (729, 101) | (x, y) = (465, 627) |
| (x, y) = (778, 97) | (x, y) = (547, 627) |
| (x, y) = (825, 101) | (x, y) = (629, 629) |
| (x, y) = (873, 98) | (x, y) = (712, 631) |
| (x, y) = (921, 98) | (x, y) = (795, 633) |
| (x, y) = (969, 98) | (x, y) = (879, 634) |
| (x, y) = (1017, 99) | (x, y) = (961, 636) |
| (x, y) = (1066, 98) | (x, y) = (1043, 637) |
| (x, y) = (1114, 98) | (x, y) = (1122, 593) |
| (x, y) = (1162, 98) | (x, y) = (1205, 639) |
| (x, y) = (1210, 98) | (x, y) = (1287, 641) |
| (x, y) = (1259, 99) | (x, y) = (1371, 642) |
| (x, y) = (1307, 100) | (x, y) = (1457, 643) |
| (x, y) = (1355, 99) | (x, y) = (1543, 645) |
| (x, y) = (1403, 99) | (x, y) = (1628, 645) |
| (x, y) = (1451, 99) | (x, y) = (1713, 647) |
| (x, y) = (1499, 99) | (x, y) = (1796, 648) |
| (x, y) = (1546, 100) | (x, y) = (1878, 651) |
| (x, y) = (1594, 101) | (x, y) = (1956, 652) |
| (x, y) = (1641, 102) | (x, y) = (2033, 654) |

| Left frame coordinate information | Right frame coordinate information |
|---|---|
| (x, y) = (634, 96) | (x, y) = (1657, 100) |
| (x, y) = (641, 121) | (x, y) = (1680, 126) |
| (x, y) = (621, 148) | (x, y) = (1701, 153) |
| (x, y) = (602, 177) | (x, y) = (1723, 182) |
| (x, y) = (582, 208) | (x, y) = (1747, 214) |
| (x, y) = (562, 242) | (x, y) = (1773, 248) |
| (x, y) = (534, 279) | (x, y) = (1801, 285) |
| (x, y) = (508, 320) | (x, y) = (1831, 326) |
| (x, y) = (479, 363) | (x, y) = (1863, 370) |
| (x, y) = (446, 412) | (x, y) = (1899, 418) |
| (x, y) = (395, 466) | (x, y) = (1937, 471) |
| (x, y) = (376, 523) | (x, y) = (1980, 529) |
| (x, y) = (334, 588) | (x, y) = (2026, 594) |
| (x, y) = (1160, 663) | (x, y) = (2076, 666) |

| Coordinates of four corners of original image | Coordinates of four corners of corrected image after automatic alignment |
|---|---|
| (x, y) = (211, 30) | (x, y) = (216, 32) |
| (x, y) = (554, 32) | (x, y) = (553, 32) |
| (x, y) = (85, 228) | (x, y) = (105, 208) |
| (x, y) = (697, 229) | (x, y) = (692, 218) |

PROJECTION SYSTEM AND PROJECTION METHOD

CROSS-REFERENCE TO RELATED APPLICATION

This application claims the priority benefit of China application serial no. 201810852009.3, filed on Jul. 30, 2018. The entirety of the above-mentioned patent application is hereby incorporated by reference herein and made a part of this specification.

BACKGROUND OF THE INVENTION

Technical Field

The invention relates to a projection system and a projection method, and in particular to a projection system and a projection method capable of automatically aligning a projected image to a frame.

Description of Related Art

When a projector projects an image to a projection screen, a user often manually adjusts the projected image so that the image is aligned to a position of a frame of the projection screen. However, it is difficult to accurately position the projector, and thus significant amount of time may be wasted by well positioning the projector. Therefore, how to automatically align the projection screen of the projector to the frame and how to automatically project the projected image of the projector into the frame is what those skilled in the art should strive for.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a projection system and a projection method capable of automatically aligning a projected image of a projector to a frame.

Other objectives and advantages of the invention can be further understood through the technical features disclosed in the invention.

In order to achieve one of, a part of or all of the above-mentioned advantages, or to achieve other advantages, an embodiment of the invention provides a projection system including a projector, an image capturing device, a processor, and a projection screen. The processor is coupled to the projector and the image capturing device. The projector projects a correction image towards the projection screen. The correction image has a pattern, a portion of the pattern exceeds the frame of the projection screen, and the pattern includes a plurality of strip regions. The image capturing device faces towards the projection screen and obtains a captured image, and transmits the captured image to the processor. Here, the captured image has brightness information of the strip regions. The processor analyzes a brightness difference of the strip regions between the projection screen and the frame in the captured image and calculates a position of the frame based on the brightness difference, and the processor performs calculations according to the position of the frame to obtain a coordinate conversion table. The projector performs a warping operation on the projected image according to the coordinate conversion table and projects the projected image having undergone the warping operation into the projection screen.

To achieve one or some or all of the objectives above or other objectives, an embodiment of the invention provides a projection method, and the method includes: projecting a correction image towards a projection screen by a projector, wherein the correction image has a pattern, a portion of the pattern exceeds a frame of the projection screen, and the pattern includes a plurality of strip regions; obtaining a captured image by an image capturing device facing towards the projection screen and transmitting the captured image to the processor, wherein the captured image has brightness information of the strip regions; analyzing a brightness difference of the strip regions in the captured image between the projection screen and the frame, calculating a position of the frame according to the brightness difference, and performing calculations according to the position of the frame to obtain a coordinate conversion table; performing a warping operation on the projected image according to the coordinate conversion table and projecting the projected image having undergone the warping operation into the projection screen by the projector.

Based on the above, through the projection system and the projection method provided in one or more embodiments of the invention, the correction image having the pattern is projected to the projection screen, and the brightness information of the strip regions of the pattern is captured. The processor analyzes the brightness difference of the strip regions between the projection screen and the frame and calculates the position of the frame based on the brightness difference. Finally, the projector performs a warping operation on the projected image to match the position of the frame, and projects the projected image having undergone the warping operation to the projection screen.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. The terms used herein such as "above," "below," "front," "back," "left," and "right" are for the purpose of describing directions in the figures only. Accordingly, the drawings and descriptions will be regarded as illustrative in nature and not as restrictive.

Figure 1:
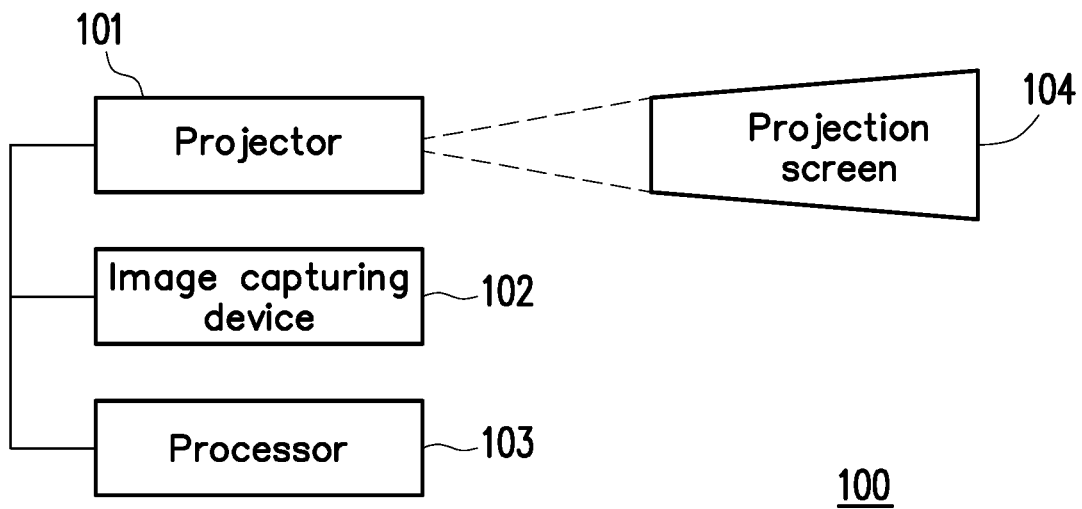
FIG. 1 is a schematic diagram of a projection system according to an embodiment of the invention.

FIG. 1 is a schematic diagram of a projection system according to an embodiment of the invention.

With reference to FIG. 1, the projection system 100 provided in an embodiment of the invention includes a projector 101, an image capturing device 102, a processor 103, and a projection screen 104. The projector 101 projects a correction image to the projection screen 104. The image capturing device 102 captures an image from the projection screen 104 to obtain a captured image. The processor 103 is coupled to the projector 101 and the image capturing device 102, and the processor 103 receives the captured image obtained by the image capturing device 102, calculates a position of a frame of the projection screen 104 according to a brightness difference of the captured image, and then performs calculations according to the position of the frame to obtain a coordinate conversion table. When the projector 101 projects a formal projected image, a warping operation may be performed on the projected image according to the coordinate conversion table, and the projected image having undergone the warping operation is projected into the projection screen 104, so as to ensure that the projected image having undergone the warping operation is located within the frame of the projection screen 104.

In an embodiment, the image capturing device 102 is, for example, a charge coupled device (CCD) image sensor or a complementary metal oxide semiconductor (CMOS) image sensor. The image capturing device 102 may be arranged in the projector 101. In another embodiment, the image capturing device 102 may be an independent device and disposed on the outside of the projector 101. The processor 103 may be a central processing unit (CPU), a programmable microprocessor of general purpose or special purpose, a digital signal processor (DSP), a programmable controllers, an application specific integrated circuit (ASIC), another similar device, or a combination of the above-mentioned devices, which should not be construed as a limitation to the invention. In an embodiment, the processor 103 may be disposed in the projector 101. In another embodiment, the processor 103 may be disposed in an electronic device (e.g., a laptop or the like) coupled to the projector 101.

Figure 2:
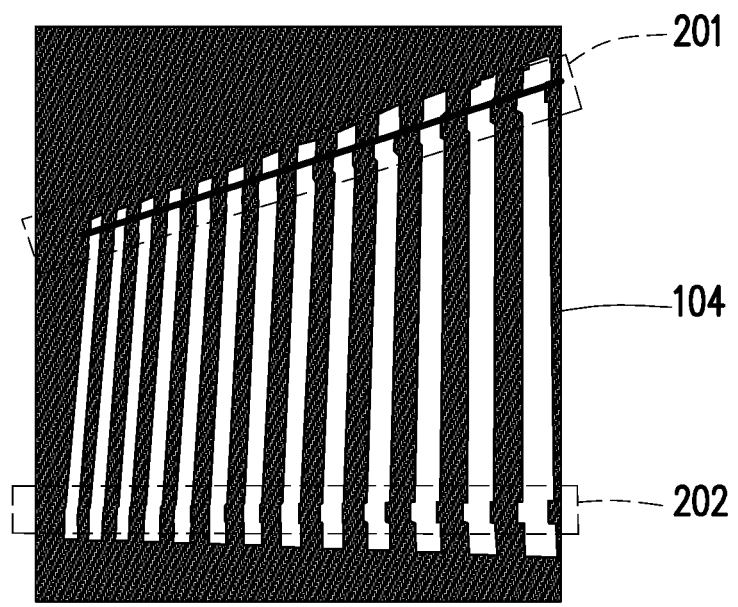
FIG. 2 is a schematic diagram of projecting a correction image having a vertical pattern to a projection screen according to an embodiment of the invention.

FIG. 2 is a schematic diagram of projecting a correction image having a vertical pattern to a projection screen according to an embodiment of the invention.

With reference to FIG. 2, the correction image has a vertical pattern in which black strip regions and white strip regions are alternately arranged and spaced apart from each other. When the correction image is projected to the projection screen 104 by the projector 101, and a portion of the vertical pattern of the correction image exceeds the frame of the projection screen 104, the white strip regions of each vertical pattern have a brightness difference between the projection screen 104 and its frame (e.g., an upper frame 201 and a lower frame 202). The processor 103 calculates a position of the frame based on the brightness difference.

In an embodiment, the processor 103 may divide each white strip region into a plurality of blocks and calculate brightness information of each block. The processor 103 calculates the average value of the brightness of all of the blocks of one white strip region. When a difference between the brightness of one of the blocks (e.g., the first block) and the average brightness of the blocks is greater than a preset threshold value, it indicates that the first block is located on the frame of the projection screen 104. Therefore, the processor 103 may obtain the position information of the frame according to the first block of the white strip region. It is worth noting that the brightness information of one block may be represented by the average value of the brightness of all pixels of the block, by the brightness of the center pixel of the block, or by a median of the brightness of all the pixels of the block, and the way to calculate the brightness information of the blocks is not limited herein.

In another embodiment, the processor 103 may also obtain a plurality of sampling points in each white strip region and obtain the position information of the frame according to brightness information of the sampling points. Here, the sampling points are vertically arranged and spaced at the same interval. That is to say, the processor 103 may calculate the average value of the brightness of all the sampling points and retrieve a sampling point, in which the difference between the brightness of the sampling point and the average value of the brightness is greater than the preset threshold value, as the sampling point located on the frame.

Figure 3:
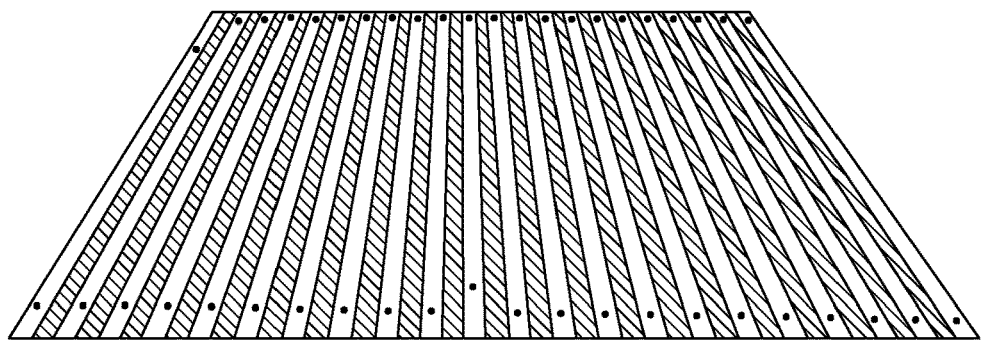
FIG. 3 is a schematic diagram of calculating an upper frame position and a lower frame position according to an embodiment of the invention.
Figures 4, 5:
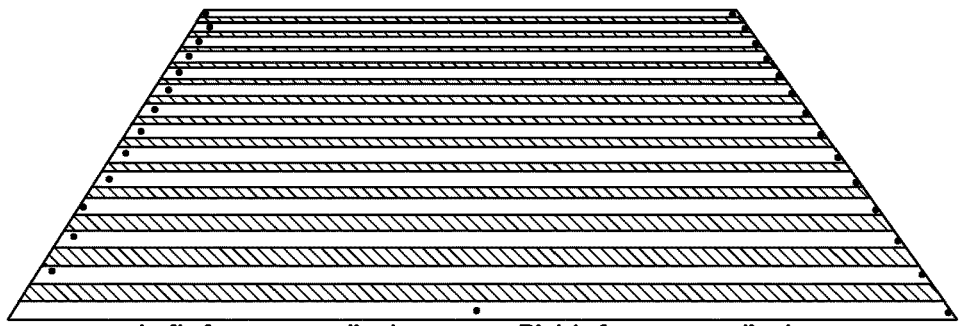
FIG. 4 is a schematic diagram of calculating a left frame position and a right frame position according to an embodiment of the invention.
FIG. 5 is a schematic diagram of warping operation information according to an embodiment of the invention.

Therefore, the processor 103 may calculate upper frame coordinate information and lower frame coordinate information according to the brightness difference of the white strip regions of the vertical pattern between the projection screen 104 and the frame, as shown in FIG. 3. Similarly, another correction image may have a horizontal pattern with black strip regions and white strip regions alternately arranged and spaced apart from each other. The processor 103 may also calculate left frame coordinate information and right frame coordinate information according to the brightness difference of the white strip regions of the horizontal pattern between the projection screen 104 and the frame, as shown in FIG. 4. After obtaining the coordinate information of the frame, the processor 103 may perform calculations to obtain four approximate linear equations corresponding to the upper frame, the lower frame, the left frame, and the right frame and further calculate four intersection points of said linear equations as the four corners of the projected image after correction, as shown in FIG. 5. The processor 103 may perform calculations to obtain a coordinate conversion table according to the four corners and transmit the coordinate conversion table to the projector 101. As such, the projector 101 may perform a warping operation on the projected image according to the coordinate conversion table and project the projected image having undergone the warping operation into the frame of the projection screen.

FIG. 2 to FIG. 5 illustrate the calculation of coordinates of the frame while the correction image has the horizontal pattern or the vertical pattern. In another embodiment, the processor 103 calculates the coordinates of the frame while the correction image has a slanted pattern.

Figure 6:
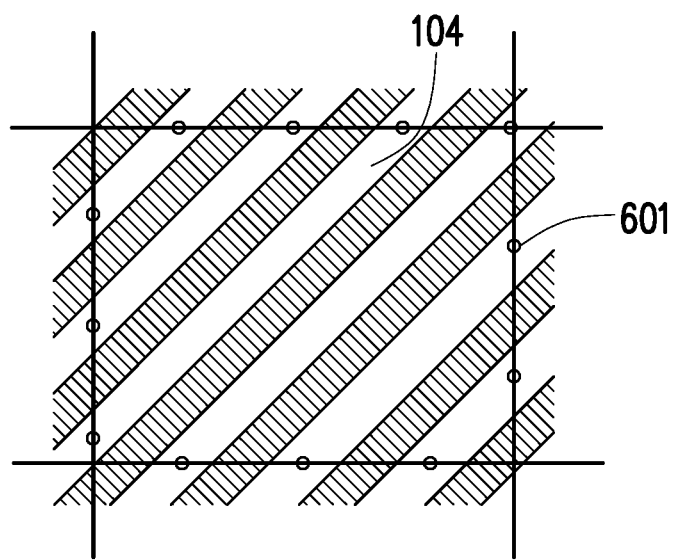
FIG. 6 is a schematic diagram of projecting a correction image having a slanted pattern to a projection screen according to an embodiment of the invention.

FIG. 6 is a schematic diagram of projecting a correction image having a slanted pattern to a projection screen according to an embodiment of the invention.

With reference to FIG. 6, the projector 101 may also project a slanted pattern having black strip regions and white strip regions to the projection screen 104. The black strip regions and the white strip regions are alternately arranged and spaced apart from each other. The processor 103 obtains the frame coordinate information 601 (indicated by a circle) according to the brightness difference of the white strip regions between the projection screen 104 and the frame and performs calculations to simultaneously obtain four approximate linear equations corresponding to the upper frame, the lower frame, the left frame, and the right frame The processor 103 further calculates the four intersection points of said four linear equations as the four corners of the projected image after correction.

In another embodiment, the processor 103 calculates the coordinates of the frame while the correction image has a checkerboard pattern.

Figure 7:
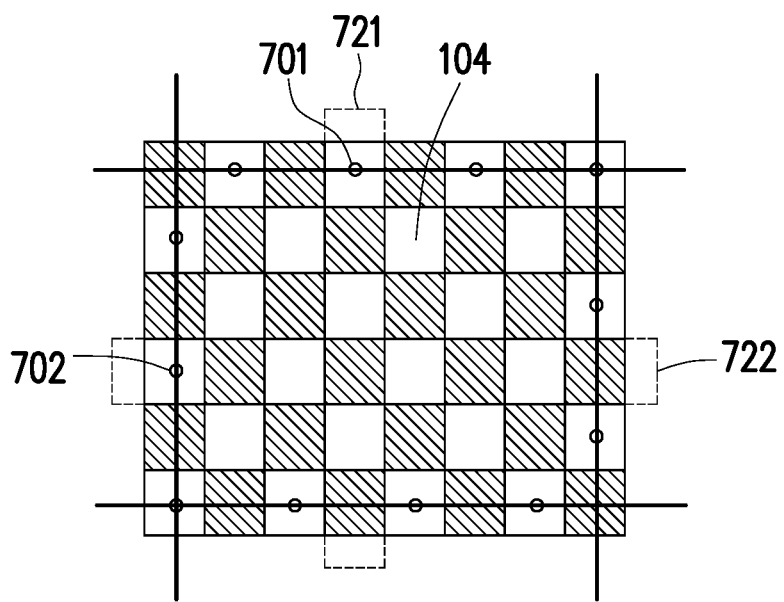
FIG. 7 is a schematic diagram of projecting a correction image having a checkerboard pattern to a projection screen according to an embodiment of the invention.

FIG. 7 is a schematic diagram of projecting a correction image having a checkerboard pattern to a projection screen according to an embodiment of the invention.

With reference to FIG. 7, the projector 101 may also project a checkerboard pattern having black squares and white squares to the projection screen 104 to the projection screen 104. The black squares and the white squares are alternately arranged and spaced apart from each other. For instance, the processor 103 may obtain the frame coordinate information 701 according to the brightness difference of the white squares in the vertical strip regions 721 between the projection screen 104 and the frame. At the same time, the processor 103 may also obtain the frame coordinate information 702 according to the brightness difference of the white squares in the horizontal strip regions 722 between the projection screen 104 and the frame. The frame coordinate information (indicated by a circle) corresponding to all strip regions may be obtained in the same manner, and all the frame coordinate information may be applied to perform calculations to obtain four approximate linear equations corresponding to the upper frame, the lower frame, the left frame, and the right frame. The processor 103 further calculates the four intersection points of said four linear equations as the four corners of the projected image after correction.

If the frame coordinate information cannot be calculated because the edge of the strip region is located at the position of the frame, the processor 103 cannot determine the position of the frame; in this case, the projector 101 may adjust the interval between the black squares and the white squares of the checkerboard pattern and then project the checkerboard pattern to the projection screen 104.

To sum up, through the projection system and the projection method provided in one or more embodiments of the invention, the correction image with the pattern is projected to the projection screen, and the brightness information of the strip regions of the pattern is captured. The processor analyzes the brightness difference of the strip regions between the projection screen and the frame and calculates the position of the frame based on the brightness difference. Finally, the projector performs the warping operation on the projected image to match the position of the frame and projects the projected image having undergone the warping operation into the projection screen, so that the projected image having undergone the warping operation is aligned to the frame.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system comprising: a projector, an image capturing device, a processor, and a projection screen, wherein the processor is coupled to the projector and the image capturing device;

the projector projects a correction image towards the projection screen, wherein the correction image has a pattern, a portion of the pattern exceeds a frame of the projection screen, and the pattern includes a plurality of strip regions;

the image capturing device faces towards the projection screen and obtains a captured image, and transmits the captured image to the processor, the captured image having brightness information of the plurality of strip regions;

the processor analyzes a brightness difference of the plurality of strip regions in the captured image between the projection screen and the frame, calculates a position of the frame according to the brightness difference, and performs calculations according to the position of the frame to obtain a coordinate conversion table, and the projector performs a warping operation on a projected image according to the coordinate conversion table and projects the projected image having undergone the warping operation into the projection screen.

2. The projection system of claim 1 wherein the processor divides one of the plurality of strip regions into a plurality of blocks and calculates brightness information of each of the plurality of blocks, the processor calculates an average value of the brightness information of each of the plurality of blocks, and when the processor determines that a difference between the brightness information of a first block of the plurality of blocks and the average value is greater than a threshold value, the processor determines that the first block is projected to the frame.

3. The projection system of claim 1, wherein the pattern comprises a vertical pattern, and the processor calculates an upper frame position and a lower frame position of the frame according to the brightness difference of the plurality of strip regions of the vertical pattern between the projection screen and the frame.

4. The projection system of claim 1, wherein the pattern comprises a horizontal pattern, and the processor calculates a left frame position and a right frame position of the frame according to the brightness difference of the plurality of strip regions of the horizontal pattern between the projection screen and the frame.

5. The projection system of claim 1, wherein the pattern comprises a slanted pattern, and the processor calculates an upper frame position, a lower frame position, a left frame position, and a right frame position of the frame according to the brightness difference of the plurality of strip regions of the slanted pattern between the projection screen and the frame.

6. The projection system of claim 1, wherein the pattern comprises a checkerboard pattern, and the processor calculates an upper frame position, a lower frame position, a left frame position, and a right frame position of the frame according to the brightness difference of the projection screen and the frame according to the brightness difference of the plurality of strip regions of the checkerboard pattern between the projection screen and the frame.

7. A projection method comprising:

projecting a correction image by a projector towards a projection screen, wherein the correction image has a pattern, a portion of the pattern exceeds a frame of the projection screen, and the pattern comprises a plurality of strip regions;

obtaining a captured image by the image capturing device facing towards the projection screen and transmitting the captured image to the processor, the captured image having brightness information of the plurality of strip regions;

analyzing a brightness difference of the plurality of strip regions in the captured image between the projection screen and the frame by the processor, calculating a position of the frame according to the brightness difference, and performing calculations according to the position of the frame to obtain a coordinate conversion table; and performing a warping operation on a projected image according to the coordinate conversion table and projecting the projected image having undergone the warping operation into the projection screen by the projector.

8. The projection method according to claim 7, wherein the step of calculating the position of the frame according to the brightness difference comprises:

dividing one of the plurality of strip regions into a plurality of blocks and calculating brightness information of each of the plurality of blocks, calculating an average value of the brightness information of each of the plurality of blocks, and when a difference between the brightness information of a first block of the plurality of blocks and the average value is greater than a threshold value, determining that the first block is projected to the frame.

9. The projection method of claim 7, wherein the pattern comprises a vertical pattern, and the step of calculating the position of the further comprises:

calculating an upper frame position and a lower frame position of the frame according to the brightness difference of the plurality of strip regions of the vertical pattern between the projection screen and the frame.

10. The projection method of claim 7, wherein the pattern comprises a horizontal pattern, and the step of calculating the position of the frame further comprises: calculating a left frame position and a right frame position of the frame according to the brightness difference of the plurality of strip regions of the horizontal pattern between the projection screen and the frame.

11. The projection method of claim 7, wherein the pattern comprises a slanted pattern, and the step of calculating the position of the frame further comprises: calculating an upper frame position, a lower frame position, a left frame position, and a right frame position of the frame according to the brightness difference of the plurality of strip regions of the slanted pattern between the projection screen and the frame.

12. The projection method of claim 7, wherein the pattern comprises a checkerboard pattern, and the step of calculating the position of the frame further comprises: calculating an upper frame position, a lower frame position, a left frame position, and a right frame position of the frame according to the brightness difference of the plurality of strip regions of the checkerboard pattern between the projection screen and the frame.

* * * * *